(12) United States Patent
Sheaffer

(10) Patent No.: US 6,976,049 B2
(45) Date of Patent: *Dec. 13, 2005

(54) METHOD AND APPARATUS FOR IMPLEMENTING SINGLE/DUAL PACKED MULTI-WAY ADDITION INSTRUCTIONS HAVING ACCUMULATION OPTIONS

(75) Inventor: Gad Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 628 days.

This patent is subject to a terminal disclaimer.

(21) Appl. No.: 10/107,257

(22) Filed: Mar. 28, 2002

(65) Prior Publication Data

US 2003/0191789 A1 Oct. 9, 2003

(51) Int. Cl.$^7$ .............................................. G06F 15/00
(52) U.S. Cl. ........................................ 708/490; 708/523
(58) Field of Search ............................... 708/490, 523, 708/524, 525

(56) References Cited

U.S. PATENT DOCUMENTS

| | | | | |
|---|---|---|---|---|
| 4,334,273 A | * | 6/1982 | Ikeda .......................... 702/74 |
| 6,078,941 A | * | 6/2000 | Jiang et al. .................. 708/625 |
| 6,141,673 A | * | 10/2000 | Thayer et al. ............... 708/402 |
| 6,658,578 B1 | * | 12/2003 | Laurenti et al. ............. 713/324 |
| 2002/0143837 A1 | * | 10/2002 | Duborgel ..................... 708/523 |
| 2003/0225998 A1 | * | 12/2003 | Khan et al. .................. 712/210 |

* cited by examiner

Primary Examiner—Chuong Dinh Ngo
(74) Attorney, Agent, or Firm—Kenyon & Kenyon

(57) ABSTRACT

The present invention relates to a method and system for providing a single accumulatable packed multi-way addition instruction having the functionality of multiple instructions without causing any timing problems in the execute stage. Specifically, the accumulatable packed multi-way combination instruction may be associated with at least one destination and a plurality of operands and set a polarity of each of a plurality of source operands derived from the plurality of operands, if requested by the instruction. The instruction also may add selected pairs of the plurality of source operands in predetermined orders to obtain at least one result and, if requested by the instruction, accumulating the plurality of results to obtain at least one accumulated result; output at least one predetermined pair of the at least one result and the at least one accumulated result; and accumulate condition codes for each of the at least one result and the at least one accumulated result, if requested by the instruction.

30 Claims, 5 Drawing Sheets

METHOD AND APPARATUS FOR IMPLEMENTING SINGLE/DUAL PACKED MULTI-WAY ADDITION INSTRUCTIONS HAVING ACCUMULATION OPTIONS

FIELD OF THE INVENTION

The present invention relates to processor architectures and instruction sets, and in particular, to processor architectures with instruction sets that provide single/dual packed multi-way addition instructions having accumulation options.

BACKGROUND

In modern processors, in general, in the following sequential order: the processor reads an instruction, a decoder in the processor decodes the instruction, and, then, the processor executes the instruction. In older processors the clock speed of the processor was generally slow enough that the reading, decoding and executing of each instruction could occur in a single clock cycle. However, modem microprocessors have improved performance by going to shorter clock cycles (that is, higher frequencies). These shorter clock cycles tend to make instructions require multiple, smaller sub-actions that can fit into the cycle time. Executing many such sub-actions in parallel, as in a pipelined and/or super-scalar processor, can improve performance even further. For example, although the cycle time of a present-day processor is determined by a number of factors, the cycle time is, generally, determined by the number of gate inversions that need to be preformed during a single cycle. Ideally, the execute stage determines the cycle time. However, in reality, this is not always the case. With the desire to operate at high frequency, the execute stage can be performed across more than one cycle, since it is an activity that can be pipelined. In a large number of workloads the added latency caused by the additional cycle(s) has only a small impact on processor performance. The ultimate goal of many systems is to be able to complete the execution of as many instructions as quickly and as efficiently as possible without adversely impacting the cycle time of the processor.

One way to increase the number of instructions, or equivalent instructions, that can be executed is to create a single instruction that can perform work that currently can only be accomplished by using multiple instructions without causing any timing problems during the execute phase. An instruction of this type can be especially effective in performing multiple additions both with and without accumulation of the results of the additions.

DETAILED DESCRIPTION

Figure 1:
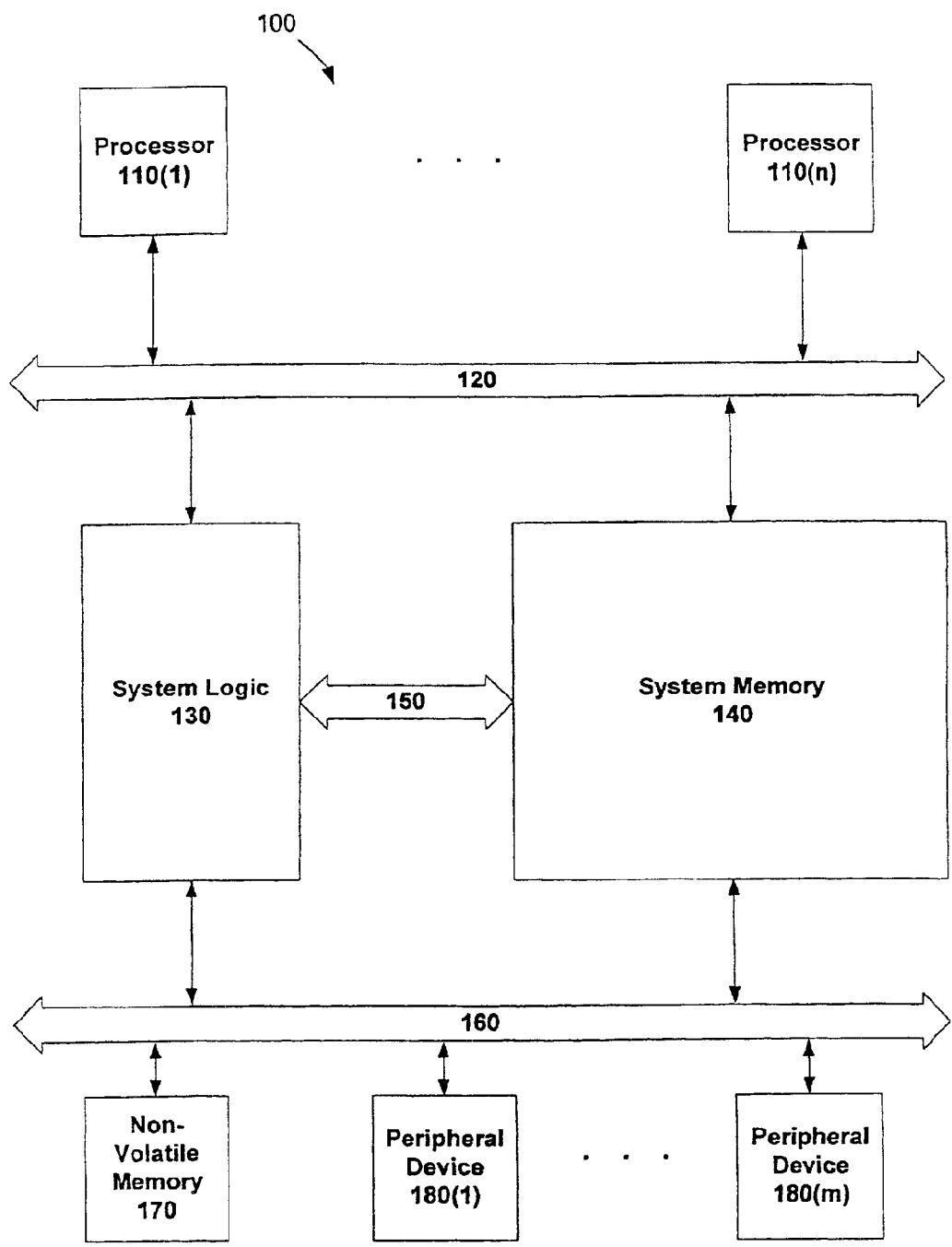
FIG. 1 is a block diagram of a computer system that includes an architectural state including one or more processors, registers and memory, in accordance with an embodiment of the present invention.

In accordance with an embodiment of the present invention, single/dual packed multi-way addition instructions having accumulation options may be implemented to execute in 2 cycles using, for example, 3:1 adders to perform the addition and conditional accumulation. For example, a 2-way addition instruction may be implemented using a multiplexer in the first pipe stage and a 3:1 adder in the second pipe stage to perform the addition and conditional accumulation. The instruction may operate in a fully pipelined manner (that is, with a throughput of one instruction every cycle) and produce a result after two (2) cycles. Similarly, for example, in accordance with another embodiment of the present invention, a 4-way addition instruction may be implemented using a multiplexer followed by a 2:1 adder in the first pipe stage and a 3:1 adder in the second pipe stage to perform the addition and conditional accumulation. Both the 2-way instruction and the 4-way instruction also may use a number of special purpose registers to determine the polarity of operands, the definitions of which are specified below merely to illustrate one possible embodiment of the present invention. Likewise, both instructions also may produce and store multiple flags into one or more of the special purpose registers, the operation of the 3:1 adders may be dynamically controllable at runtime, and any data generated during the execution of either of the 2-way and/or 4-way instruction may determine the operation of subsequent instructions.

In accordance with an embodiment of the present invention, the basic hardware that may be used by the multi-way addition instructions may include 8-bit and 16-bit adders, which may be fitted easily in a single cycle of any processor. This is especially true if the processor on which the instructions are running operates on higher precision data types such as 64-bit integers and floating point numbers. For example, since the adders are of lower computational complexity, two 3:1, 16-bit adders may be implemented in 2 consecutive execute stages without impacting the cycle time of the processor.

In addition, implementing the whole operation in a single instruction may provide a significant savings in the pipeline front-end instruction supply requirements, since the functionality of multiple instructions may be packed into a single instruction without causing any timing problems during the execute stage.

The impact of the multi-way addition instructions on overall performance can be significant. For example, in accordance with an embodiment of the present invention, the multi-way addition instructions may reduce the latency required for performing the same operation with current instructions by a factor of at least 2, thus, enabling a significant speedup of applications using one or both of these instructions. Specifically, the instruction may enable significant speedup of the execution of a large class of applications, for example, applications for modems, speech and video.

FIG. 1 is a block diagram of a computer system, which includes an architectural state, including one or more processors, registers and memory, in accordance with an embodiment of the present invention. In FIG. 1, a computer system 100 may include one or more processors 110(1)–110(n) coupled to a processor bus 120, which may be coupled to a system logic 130. Each of the one or more processors 110(1)–110(n) may be N-bit processors and may include a decoder (not shown) and one or more N-bit registers (not shown). System logic 130 may be coupled to a system memory 140 through a bus 150 and coupled to a non-volatile memory 170 and one or more peripheral devices 180(1)–180(m) through a peripheral bus 160. Peripheral bus 160 may represent, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 170 may be a static memory device such as a read only memory (ROM) or a flash memory. Peripheral devices 180(1)–180(m) may include, for example, a keyboard; a mouse or other pointing devices; mass storage devices such as hard disk drives, compact disc (CD) drives, optical disks, and digital video disc (DVD) drives; displays and the like.

Figure 2:
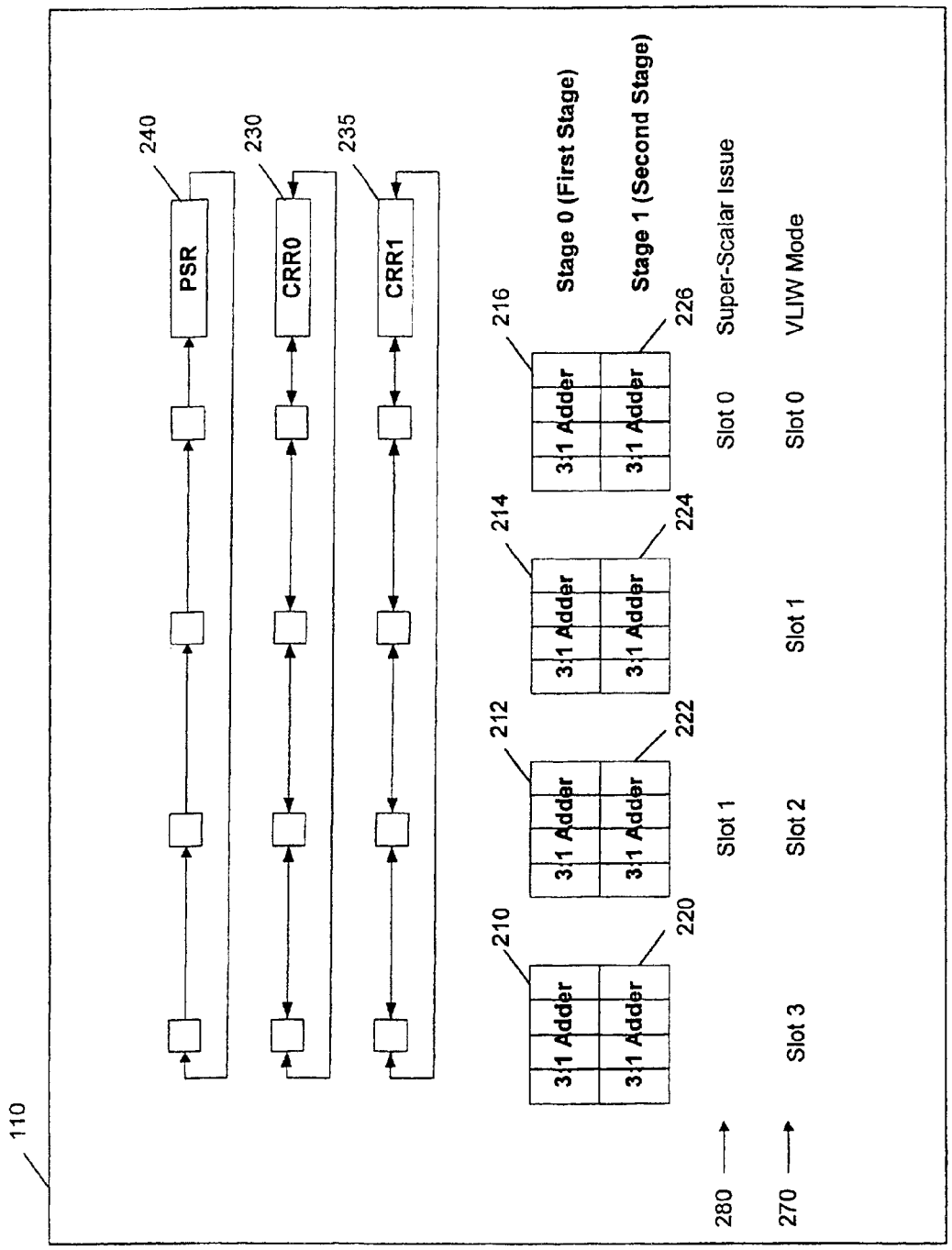
FIG. 2 is an exemplary structure of a processing core of the computer of FIG. 1 having a super-scalar and/or Very Long Instruction Word (VLIW) issue with multiple 3:1 adders implemented in two consecutive execute stages, in accordance with an embodiment of the present invention.

FIG. 2 is an exemplary structure of a processor 110 of the computer of FIG. 1 having a super-scalar and/or Very Long Instruction Word (VLIW) issue with multiple 3:1 adders 210, 212, 214, 216, 220, 222, 224 and 226 implemented in 2 consecutive execute stages, in accordance with an embodiment of the present invention. Processor 110 also may include several common registers including, for example, Compare Result Registers (CRR0, CRR1) 230, 235 and a polarity setting register (PSR) 240. CRR0 230 and CRR1 235 may be implemented as shift-registers into which all the arithmetic flags generated in a cycle may be shifted. If more than one instruction causing a shift is issued to one of the CRR registers 230, 235 in the same cycle, the CRR registers 230, 235 may be shifted by the sum of the number of instructions causing the shifts.

For example, all of the instructions consuming the contents of one of CRR0 230 and CRR1 235 may conditionally shift the CRR register used after reading the relevant bits out of the CRR register used. In contrast, all of the instructions modifying the CRR registers may shift the bits of the CRR register used before updating that CRR register. For example, in accordance with an embodiment of the present invention, CRR0 230 may be used for collecting flags generated by the first stage of execution, and for providing flags to the first execution stage. Likewise, CRR1 235 may perform the same function for the second execution stage and for providing flags to the second execution stage. Using CRR0 230 for the first stage flags and CRR1 235 for the second stage flags enables instructions that are writing to and/or reading from CRR0 230 and/or 235 to execute back-to-back, that is, in consecutive cycles, without conflict.

In accordance with an embodiment of the present invention, PSR 240 may be implemented as a 32-bit register to control the polarity of the input operands. When the PSR option is set in an instruction, the value of the bits in PSR 240 may control the polarity of the input operands in the instruction. Similar to CRR0 230 and CRR1 235, PSR 240 may be conditionally rotated when bits in PSR 240 are consumed by instructions that use PSR 240. If more than one instruction is causing PSR 240 to rotate in the same cycle, PSR 240 may be rotated by the sum of the number of bits consumed by each of the instructions causing the rotation.

The multi-way addition instructions may use the control bits from PSR 240 and may use/update bits in CRR0 230 and CRR1 235 based on the issue slot in which the instruction is executed. For example, for an instruction number, I, I may be $\in \{0,1\}$ in Super-scalar mode, and I may be $\in \{0,1,2,3\}$ in VLIW mode, where only the adder issue slots 270 and 280 are considered.

In order to minimize the amount of connectivity required to steer bits into and out of the CRR registers 230, 235 and PSR 240, the instructions using PSR 240, CRR0 230, and CRR1 235, in general, may be packed into the lower issue slots. This means that if N such instructions are issued, they would occupy issue slots 0 to N-1. This restriction, generally, can be easily enforced in VLIW mode, for example, in the four (4) issue slots 270 in FIG. 2. Unfortunately, in super-scalar mode it can be harder to enforce, and occasionally may cause the processor 110 to stall. However, in FIG. 2, in super-scalar mode, if there are only two (2) issue slots 280, it may be easier to provide the required connectivity to enable issuing a single instruction using these registers into slot 1 rather than slot 0.

The multi-way addition instructions may be described in the context of the processor 110 having a Super-Scalar issue and/or a VLIW issue. For example, in accordance with an embodiment of the present invention, the data type may be assumed to be 16-bits and the processing core may be assumed to have a 32-bit data path and 32-bit registers. However, it should be clearly understood that this example is merely illustrative and in no way intended to limit the scope of the present invention, since the data type and processing core may be of any other precision either below or the above 16-bit data type:32-bit processing core ratio, for example, 8-bit:32-bit, 16-bit:64-bit or 32-bit: 128-bit.

Figure 3:
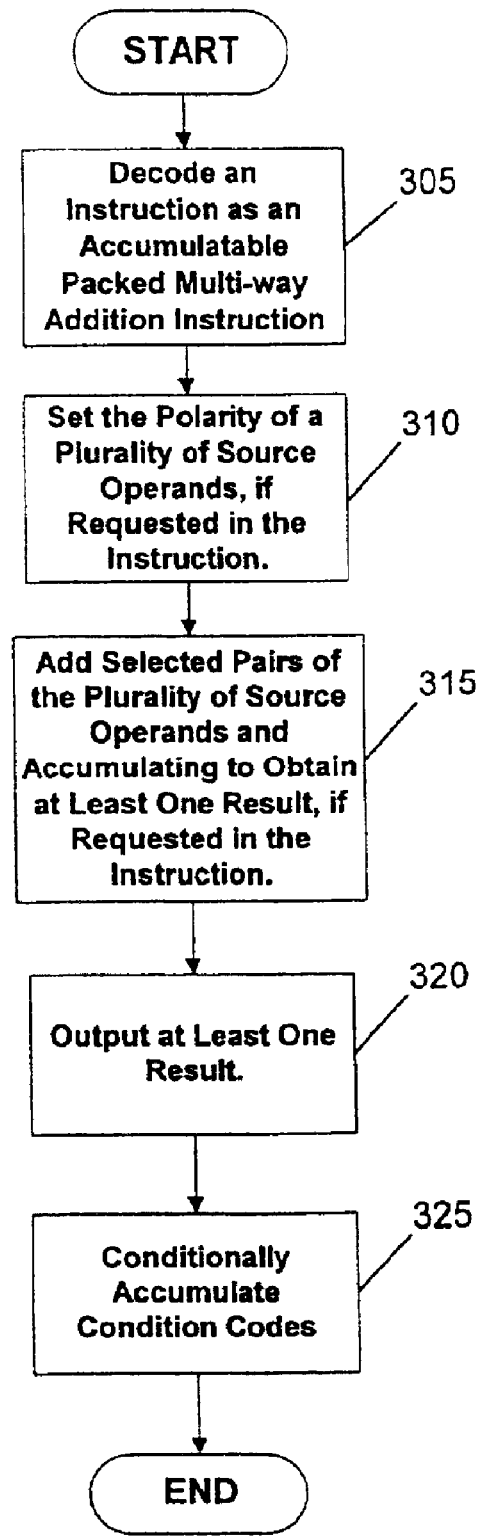
FIG. 3 is a top-level flow diagram of a method for providing an accumulatable packed multi-way addition instruction in a processor, in accordance with an embodiment of the present invention.

FIG. 3 is a top-level flow diagram of a method for providing an accumulatable packed multi-way addition instruction in a processor, in accordance with an embodiment of the present invention. In FIG. 3, an instruction may be decoded 305 as an accumulatable packed multi-way addition instruction. In the method, the polarity of a plurality of source operands may be conditionally set 310 if the PSR register is used. Selected pairs of the plurality of source operands may be added 315 in predetermined orders to obtain a plurality of results or results of the added selected pairs of said plurality of source operands may be conditionally accumulated 315 to obtain a plurality of accumulated results. The method may further include outputting 320 at least one predetermined pair of one of the plurality of results and the plurality of accumulated results. The method may also include conditionally accumulating 325 condition codes for each of one of the plurality of results and the plurality of accumulated results.

In accordance with an embodiment of the present invention, the method of FIG. 3 may be performed in processor 110 of FIG. 2 in two (2) cycles. In FIG. 3, the decoding 305 and conditionally setting the polarity 310 operations may occur in a first cycle; and the adding 315, outputting 320 and conditionally accumulating 325 operations may occur in a second cycle. In accordance with other embodiments of the present invention, the method of FIG. 3 also may be performed in one (1) cycle as well as three (3) or more cycles.

In accordance with an embodiment of the present invention, the generalized dual 2-way addition instruction may be implemented to combine 2 input values into a single result and/or 4 input values into two results. For example, the 2-way addition instruction may add 2 or more input values, optionally set operand polarity, optionally set compare result registers, optionally accumulate results from previous cycles, and output the final result to one or more destination registers. Specifically, the generic syntax of the 2-way addition instruction with 4 input values may be represented by:

[PSR] [CRR] destR0, destR1=GADD2(srcA, srcB, srcC, srcD) [acc], where the square brackets ([ ]) denote the optional instruction parameters that are not required for execution of the instruction. Likewise, in accordance with an embodiment of the present invention, the generic syntax of the 2-way addition instruction with only 2 input values may be represented by:

[PSR] [CRR] destR0=GADD2(srcA, srcB) [acc].

Setting PSR to TRUE may cause the instruction to use the PSR register to set the polarity of the operands across all SIMD vector components. Setting CRR to TRUE may cause the instruction to accumulate condition codes into the CRR registers. Similarly, setting acc to TRUE may cause the instruction to accumulate the result of the current cycle with the result of the previous cycle.

In accordance with an embodiment of the present invention, the instructions described below may be, generally, completely executed over two processor clock cycles. However, it should be clearly understood that the instructions also may be implemented to be executed over a single clock cycle as well as over three or more clock cycles. In the following examples, the syntax used may include variables such as signal' and signal", which are delayed versions of a variable signal by one and two cycles, respectively.

In accordance with an embodiment of the present invention, the functionality of the 2-way addition instruction with 4 inputs may be defined by the following C-style pseudo-code example:

```
First cycle:
    Setting a polarity of each of the source operands
    If PSR {
    src0 = srcA.l * {PSR[4i]      ? –1:1}
    src1 = srcA.h * {PSR[4i+1]    ? –1:1}
    src2 = srcB.l * {PSR[4i]      ? –1:1}
    src3 = srcB.h * {PSR[4i+1]    ? –1:1}
    src4 = srcC.l * {PSR[4i]      ? –1:1}
    src5 = srcC.h * {PSR[4i+1]    ? –1:1}
    src6 = srcD.l * {PSR[4i]      ? –1:1}
    src7 = srcD.h * {PSR[4i+1]    ? –1:1}
    Rotate PSR by 2
    } else {
    src0 = srcA.l
    src1 = srcA.h
    src2 = srcB.l
    src3 = srcB.h
    src4 = srcC.l
    src5 = srcC.h
    src6 = srcD.l
    src7 = srcD.h
    }
Second cycle:
    Add selected operands in pairs and conditionally accumulate the results
    If acc {
```

-continued

```
    cout00 & sum00 = src0' + src2' + sum00'
    cout01 & sum01 = src1' + src3' + sum01'
    cout10 & sum10 = src4' + src6' + sum10'
    cout11 & sum11 = src5' + src7' + sum11'
    } else {
    cout00 & sum00 = src0' + src2'
    cout01 & sum01 = src1' + src3'
    cout10 & sum10 = src4' + src6'
    cout11 & sum11 = src5' + src7'
    }
    destR0 = (sum01,sum00)
    destR1 = (sum11,sum10)
    if CRR {
    CRR1[4i] = cout00
    CRR1[4i+1] = cout01
    CRR1[4i+2] = cout10
    CRR1[4i+3] = cout11
    Shift CRR1 right by 4
    }
```

Likewise, in accordance with an embodiment of the present invention, the functionality of the 2-way addition instruction with 2 inputs may be defined by the following C-style pseudo-code example:

```
First cycle:
    Setting a polarity of each of the source operands
    If PSR {
    src0 = srcA.l * {PSR[4i]      ? –1:1}
    src1 = srcA.h * {PSR[4i+1]    ? –1:1}
    src2 = srcB.l * {PSR[4i]      ? –1:1}
    src3 = srcB.h * {PSR[4i+1]    ? –1:1}
    Rotate PSR by 2
    } else {
    src0 = srcA.l
    src1 = srcA.h
    src2 = srcB.l
    src3 = srcB.h
    }
Second cycle:
    Add selected operands in pairs and conditionally accumulate the results
    If acc {
    cout00 & sum00 = src0' + src2' + sum00'
    cout01 & sum01 = src1' + src3' + sum01'
    } else {
    cout00 & sum00 = src0' + src2'
    cout01 & sum01 = src1' + src3'
    }
    destR0 = (sum01,sum00)
    if CRR {
    CRR1[4i] = cout00
    CRR1[4i+1] = cout01
    Shift CRR1 right by 2
    }
```

Figure 4:
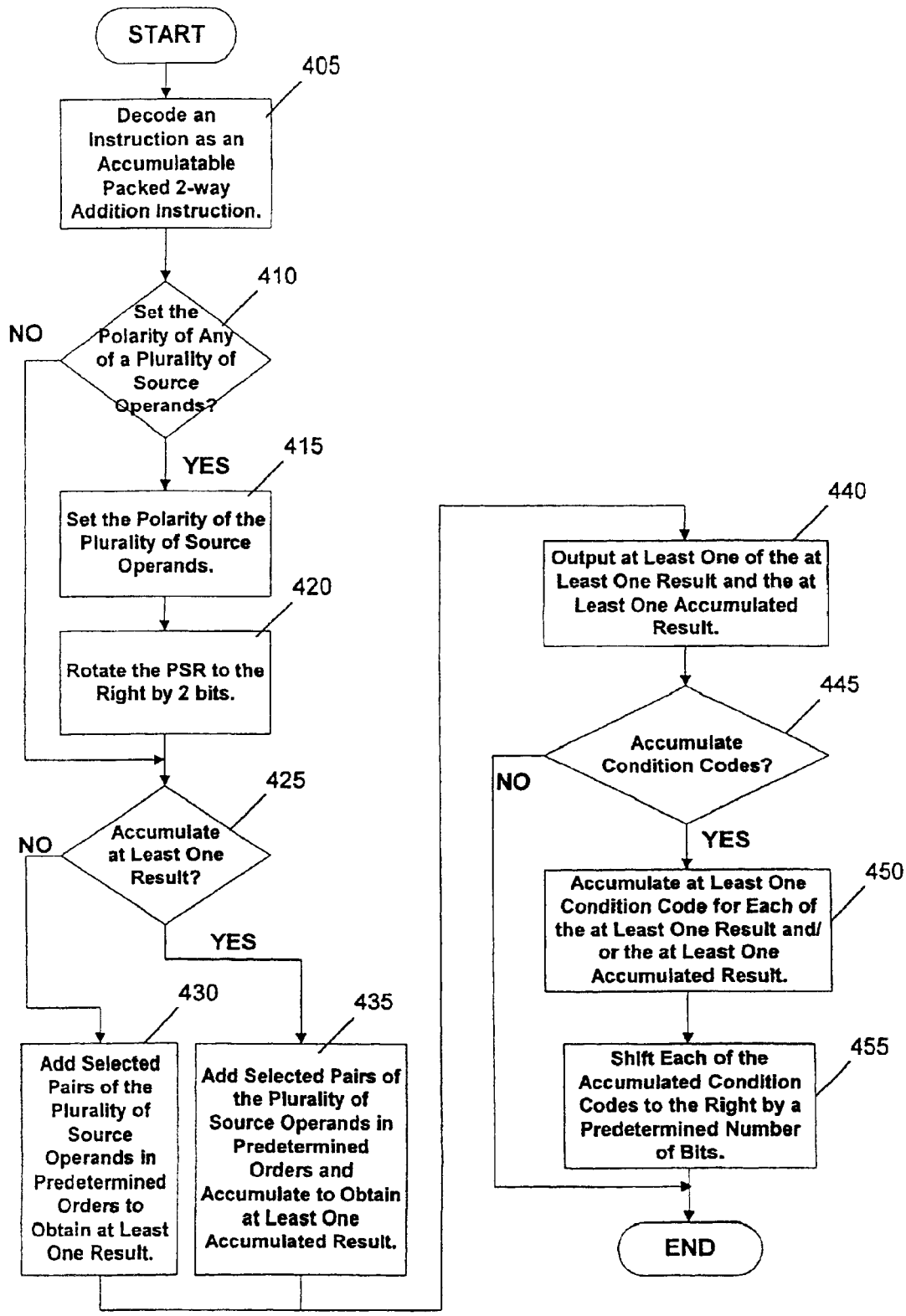
FIG. 4 is a detailed flow diagram of a method for providing an accumulatable packed 2-way addition instruction in a processor, in accordance with an embodiment of the present invention.

FIG. 4 is a detailed flow diagram of a method for providing an accumulatable packed 2-way addition instruction in a processor, in accordance with an embodiment of the present invention. The method in FIG. 4 may be operable with embodiments of the accumulatable packed 2-way addition instruction that may be implemented with 2 input values and/or 4 input values.

In FIG. 4, an instruction may be decoded 405 as an accumulatable packed 2-way addition instruction. The need to set the polarity of one or more of a plurality of source operands may be determined 410, and if the polarity needs to be set, the polarity of the one or more plurality of source operands may be set 415 and the bits in the PSR 240 may be rotated 420 to the right by 2 bits.

In FIG. 4, regardless of whether the polarity of source operands was set, whether the 2-way addition instruction calls for the results of the addition instruction to be accumulated may be determined 425. If the results of the 2-way addition instruction are not to be accumulated, selected pairs of the plurality of source operands may be added in predetermined orders to obtain a plurality of results 430. In contrast, if the results of the 2-way addition instruction are to be accumulated, selected pairs of the plurality of source operands may be added in predetermined orders and accumulated to obtain a plurality of accumulated results 435.

In FIG. 4, following the addition and/or addition with accumulation of the results 430, 435, at least one pair of one of the plurality of results and the plurality of accumulated results may be output 440.

In FIG. 4, if the 2-way addition instruction does not require the accumulation of condition codes 445, the execution of the 2-way addition instruction may terminate. If the 2-way addition instruction does require the accumulation of condition codes 445, the condition codes for each of the plurality of results and/or the plurality of accumulated results may be stored 450. Following the storage of the condition codes 450, each of the stored condition codes may be shifted to the right by a predetermined number of bits 455 and the execution of the 2-way addition instruction may terminate. For example, if the 2-way instruction only uses two (2) input values, then the accumulated condition codes may be shifted by two (2) bits. Likewise, if the 2-way instruction uses four (4) input values, then the accumulated condition codes may be shifted by four (4) bits.

In accordance with an embodiment of the present invention, and similar to the 2-way addition instruction, the generalized dual 4-way addition instruction may be implemented to combine up to 4 input values into a single result. For example, the 4-way addition instruction may add 2 or more input values, optionally set operand polarity, optionally set compare result registers, optionally accumulate results from previous cycles, and save the final result in one destination register. Specifically, the syntax of the 4-way addition instruction may be represented by:

[PSR] [CRR] destR=GADD4(srcA, srcB, srcC, srcD) [acc], where square brackets ([ ]) denote optional instruction parameters that are not required for execution of the instruction.

Setting PSR to TRUE may cause the instruction to use the PSR register to set the polarity of the operands across all SIMD vector components. Setting CRR to TRUE may cause the instruction to accumulate condition codes into the CRR registers. Similarly, setting acc to TRUE may cause the instruction to accumulate the result of the current cycle with the result of the previous cycle.

In accordance with an embodiment of the present invention, the instructions described below may be, generally, completely executed over two processor clock cycles. However, it should be clearly understood that the instructions also may be implemented to be executed over a single clock cycle as well as over three or more clock cycles.

In accordance with an embodiment of the present invention, the 4-way ADD instruction with 4 inputs may be defined by the following C-style pseudo-code example:

```
First cycle:
    Set polarity of source operands
    If PSR {
        src0 = srcA.l * {PSR[4i]}    ? -1:1}
        src1 = srcA.h * {PSR[4i+1]}  ? -1:1}
        src2 = srcB.l * {PSR[4i+2]}  ? -1:1}
        src3 = srcB.h * {PSR[4i+3]}  ? -1:1}
        src4 = srcC.l * {PSR[4i]}    ? -1:1}
        src5 = srcC.h * {PSR[4i+1]}  ? -1:1}
        src6 = srcD.l * {PSR[4i+2]}  ? -1:1}
        src7 = srcD.h * {PSR[4i+3]}  ? -1:1}
        Rotate PSR by 4
    } else {
        src0 = srcA.l
        src1 = srcA.h
        src2 = srcB.l
        src3 = srcB.h
        src4 = srcC.l
        src5 = srcC.h
        src6 = srcD.l
        src7 = srcD.h
    }
    Add selected operands in pairs
    cout00 & out00 = CRR0[2i] + src0 + src2
    cout01 & out01 = CRR0[2i+1] + src1 + src3
    cout10 & out10 = CRR0[2i+2] + src4 + src6
    cout11 & out11 = CRR0[2i+3] + src5 + src7
    if CRR {
        CRR0[2i] = cout00
        CRR0[2i+1] = cout01
        CRR0[2i+2] = cout10
        CRR0[2i+3] = cout11
        Shift CRR1 right by 4
    }
Second cycle:
    Add First cycle results and conditionally accumulate
    If acc {
        cout0 & out0 = CRR1[2i] + out00' + out01' + out0'
        cout1 & out1 = CRR1[2i+1] + out10' + out11' + out1'
    } else {
        cout0 & out0 = CRR1[2i] + out00' +out01'
        cout1 & out1 = CRR1[2i+1] + out10' + out11'
    }
    destR = (out 1, out0)
    if CRR {
        CRR1[2i] = cout0
        CRR1[2i+1] = cout1
        Shift CRR1 right by 2
    }
```

Likewise, in accordance with an embodiment of the present invention, the generic 4-way addition instruction with 2 inputs may be represented by:

[PSR] [CRR] destR=GADD4(srcA, srcB) [acc], and the functionality of the instruction may be defined by the following C-style pseudo-code example:

```
First cycle:
    Set polarity of source operands
    If PSR {
        src0 = srcA.l * {PSR[4i]}    ? -1:1}
        src1 = srcA.h * {PSR[4i+1]}  ? -1:1}
        src2 = srcB.l * {PSR[4i+2]}  ? -1:1}
        src3 = srcB.h * {PSR[4i+3]}  ? -1:1}
        Rotate PSR by 4
    } else {
        src0 = srcA.l
        src1 = srcA.h
        src2 = srcB.l
        src3 = srcB.h
    }
```

-continued

```
        Add selected operands in pairs
        cout00 & out00 = CRR0[2i] + src0 + src2
        cout01 & out01 = CRR0[2i+1] + src1 + src3
        if CRR {
            CRR0[2i] = cout00
            CRR0[2i+1] = cout01
            Shift CRR1 right by 2
        }
    Second cycle:
        Add First cycle results and conditionally accumulate
        If acc {
            cout0 & out0 = CRR1[2i] + out00' +out01' + out0 '
        } else {
            cout0 & out0 = CRR1[2i] + out00' +out01'
        }
        destR = (out0)
        if CRR {
            CRR1[2i] = cout0
            Shift CRR1 right by 1
        }
```

Figure 5:
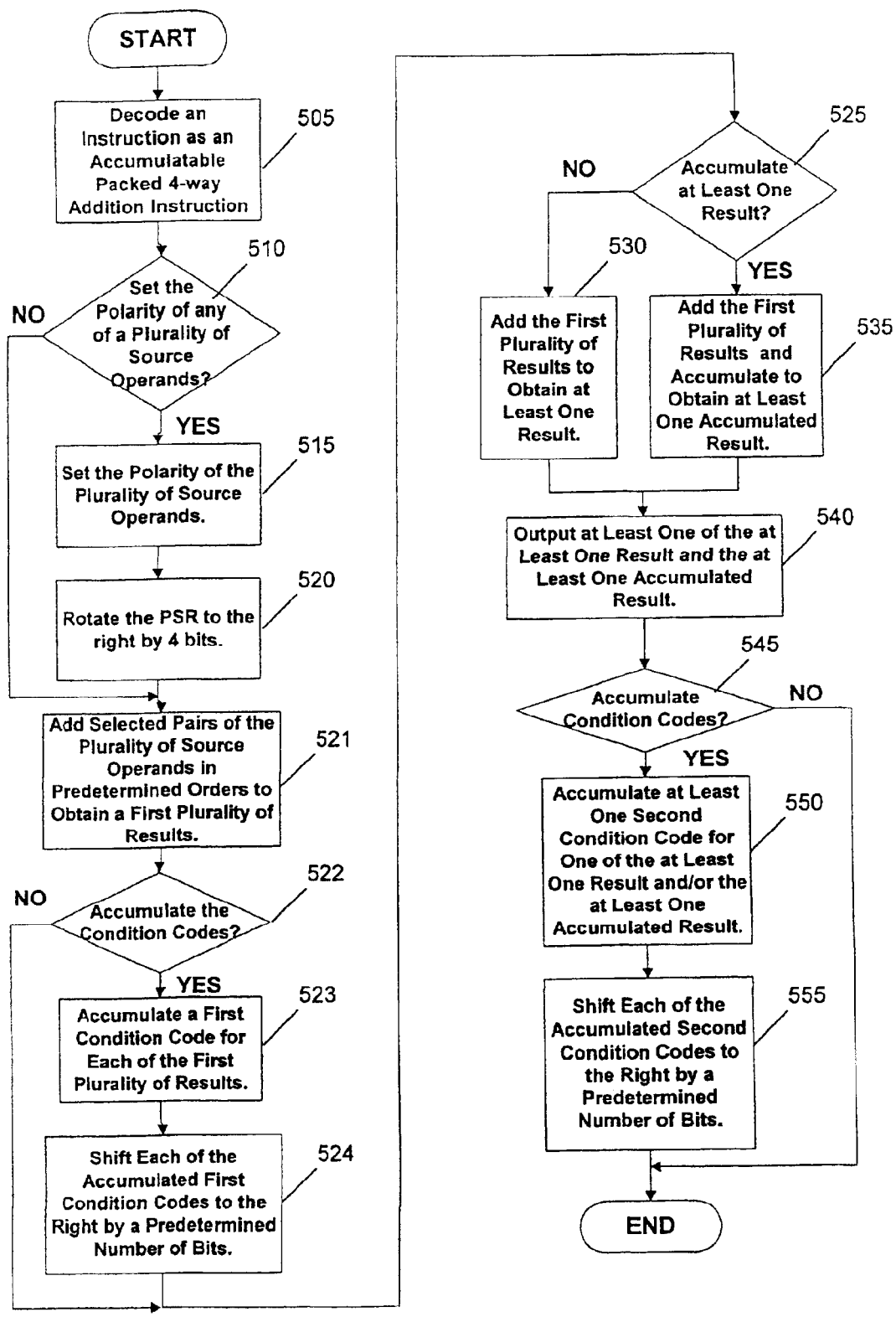
FIG. 5 is a detailed flow diagram of a method for providing an accumulatable packed 4-way addition instruction in a processor, in accordance with an embodiment of the present invention.

FIG. 5 is a detailed flow diagram of a method for providing an accumulatable packed 4-way addition instruction in a processor, in accordance with an embodiment of the present invention. Similar to the 2-way addition instruction, in embodiments of the 4-way addition instruction may include 2 or 4 input values.

In FIG. 5, an instruction may be decoded 505 as an accumulatable packed 4-way addition instruction. The need to set the polarity of one or more of a plurality of source operands may be determined 510, and if the polarity needs to be set, the polarity of the one or more plurality of source operands may be set 515 and the bits in the PSR 240 may be shifted 520 to the right by 4 bits.

In FIG. 5, regardless of whether the polarity of the source operands was set, selected pairs of the plurality of source operands may be added 522 in predetermined orders to obtain a first plurality of results.

In FIG. 5, in general, in the 4-way addition instruction, after adding 521 the selected pairs of source operands, whether the 4-way instruction requests the accumulation of condition codes may be determined 522. If condition codes are to be accumulated, a first condition code for each of the first plurality of results may be accumulated 523. After the first condition codes for each of the first plurality of results are accumulated, the first condition codes for each of the first plurality of results may be shifted 524 by a predetermined number of bits. Similar to the 2-way instruction, if the 4-way addition instruction uses 2 inputs then the first condition codes may be shifted by 2 bits and, if the 4-way addition instruction uses 4 inputs then the first condition codes may be shifted by 4 bits.

In FIG. 5, whether the 4-way addition instruction calls for the results of the addition instruction to be accumulated may be determined 525. If the results of the 4-way addition instruction are not to be accumulated, the first plurality of results may be added to obtain a plurality of results 530. In contrast, if the results of the 4-way addition instruction are to be accumulated, the first plurality of results may be added together and accumulated with any prior plurality of accumulated results to obtain a plurality of accumulated results 535.

In FIG. 5, following either the addition 530 or the addition and accumulation of the results 535, at least one pair of one of the plurality of results and the plurality of accumulated results may be stored 540.

In FIG. 5, whether the 4-way addition instruction requests the accumulation of condition codes may be determined 545. If the condition codes are not to be accumulated, execution of the 4-way addition instruction may terminate. If the condition codes are to be accumulated 545, a second condition code for each of the plurality of results and/or the plurality of accumulated results may be accumulated and stored 550. Following the storage of the condition codes 550, each of the stored condition codes may be shifted 535 to the right by a predetermined number of bits and, the execution of the 4-way addition instruction may terminate. Specifically, if the 4-way instruction has 2 inputs then the condition codes may be shifted 535 2 bits to the right and, if the 4-way instruction has 4 inputs then the condition codes may be shifted 535 4 bits to the right.

In accordance with an embodiment of the present invention, a method for providing an accumulatable packed multi-way addition instruction includes decoding an instruction as an accumulatable packed multi-way addition instruction, the accumulatable packed multi-way addition instruction being associated with at least one destination and a plurality of operands. The method also includes setting a polarity of each of a plurality of source operands derived from the plurality of operands, if requested by the accumulatable packed multi-way addition instruction. The method also includes adding selected pairs of the plurality of source operands in predetermined orders to obtain at least one result and, if requested by the accumulatable packed multi-way addition instruction, accumulating the at least one result to obtain at least one accumulated result. The method further includes outputting at least one of the at least one result and the at least one accumulated result; and accumulating condition codes for one of the at least one result and the at least one accumulated result, if requested by the accumulatable packed multi-way addition instruction.

In accordance with an embodiment of the present invention, a processor including a decoder to decode instructions and a circuit coupled to the decoder. In response to a decoded instruction, the circuit is enabled to set a polarity of each of a plurality of source operands derived from the at least two operands, if requested by the decoded instruction. The circuit is also enabled to add selected pairs of the plurality of source operands in predetermined orders to obtain at least one result and, if requested by the decoded instruction, accumulate the at least one result to obtain at least one accumulated result. The circuit is also enabled to output at least one of the at least one result and the at least one accumulated result. The circuit is further enabled to accumulate condition codes for one of the at least one result and the at least one accumulated result, if requested by the decoded instruction.

In accordance with an embodiment of the present invention, a computer system including a processor and a machine-readable medium coupled to the processor in which is stored one or more instructions adapted to be executed by the processor. The instructions which, when executed, configure the processor to decode an instruction as an accumulatable packed multi-way addition instruction that is associated with at least one destination and a plurality of operands. The accumulatable packed multi-way addition instruction configures the processor to set a polarity of each of a plurality of source operands derived from the at least two operands, if requested by the accumulatable packed multi-way addition instruction. The instruction also configures the processor to add selected pairs of the plurality of source operands in predetermined orders to obtain at least one result and, if requested by the accumulatable packed multi-way addition instruction, accumulate the at least one result to obtain at least one accumulated result. The instruction also configures the processor to output at least one predetermined pair of the at least one result and the at least one accumulated result. The instruction further configures the processor to accumulate condition codes for each of the at least one result and the at least one accumulated result, if requested by the accumulatable packed multi-way addition instruction.

In accordance with an embodiment of the present invention, a machine-readable medium having stored therein one or more instructions which, when executed, configure a processor to decode an instruction as an accumulatable packed multi-way addition instruction that is associated with at least one destination and a plurality of operands. The instruction also configures the processor to set a polarity of each of a plurality of source operands derived from the at least two operands, if requested by the accumulatable packed multi-way addition instruction. The instruction also configures the processor to add selected pairs of the plurality of source operands in predetermined orders to obtain at least one result and, if requested by the accumulatable packed multi-way addition instruction, accumulate the at least one result to obtain at least one accumulated result. The instruction also configures the processor to output at least one predetermined pair of the at least one result and the at least one accumulated result. The instruction further configures the processor to accumulate condition codes for each of the at least one result and the at least one accumulated result, if requested by the accumulatable packed multi-way addition instruction.

While the embodiments described above relate mainly to 32-bit data path and 32 bit register-based accumulatable packed multi-way addition instruction embodiments, they are not intended to limit the scope or coverage of the present invention. In fact, the method described above may be implemented with different sized data types and processing cores such as, but not limited to, for example, 8-bit, 16-bit and/or 32-bit data with 64-bit registers, or 8-bit, 16-bit, 32-bit and/or 64-bit data with 128-bit registers.

It should, of course, be understood that while the present invention has been described mainly in terms of microprocessor-based and multiple microprocessor-based personal computer systems, those skilled in the art will recognize that the principles of the invention, as discussed herein, may be used advantageously with alternative embodiments involving other integrated processor chips and computer systems. Accordingly, all such implementations, which fall within the spirit and scope of the appended claims, will be embraced by the principles of the present invention.

What is claimed is:

1. A method for comprising:
   decoding an instruction as an accumulatable packed multi-way addition instruction, said accumulatable packed multi-way addition instruction being associated with at least one destination and a plurality of operands;
   setting a polarity of each of a plurality of source operands derived from said plurality of operands, if requested by said accumulatable packed multi-way addition instruction;
   adding pairs of said plurality of source operands to obtain at least one result and, if requested by said accumulatable packed multi-way addition instruction, accumulating said at least one result to obtain at least one accumulated result;
   outputting at least one of said at least one result and said at least one accumulated result; and
   accumulating condition codes for one of said at least one result and said at least one accumulated result, if requested by said accumulatable packed multi-way addition instruction.

2. The method of claim 1, wherein said adding comprises:
   adding a first of said plurality of source operands with a third of said plurality of source operands to obtain a first sum and, if requested by said accumulatable packed multi-way addition instruction, accumulating a prior first sum with said first and third of said plurality of source operands, to obtain a first accumulated result; and
   adding a second of said plurality of source operands with a fourth of said plurality of source operands to obtain a second sum and, if requested by said accumulatable packed multi-way addition instruction, accumulating a prior second sum with said second and fourth of said plurality of source operands, to obtain a second accumulated result.

3. The method of claim 2, further including, prior to adding any of the plurality of source operands:
   setting said first of said plurality of source operands equal to a first plurality of bits from said first of said plurality of operands, and setting said second source operand equal to a second plurality of bits from said first of said plurality of operands; and
   setting said third of said plurality of source operands equal to a first plurality of bits from said second of said plurality of operands, and setting said fourth source operand equal to a second plurality of bits from said second of said plurality of operands.

4. The method of claim 2, further comprising:
   adding a fifth of said plurality of source operands with a seventh of said plurality of source operands to obtain a third sum and, if requested by said accumulatable packed multi-way addition instruction, accumulating a prior third sum with said fifth and seventh of said plurality of source operands, to obtain a third accumulated result; and
   adding a sixth of said plurality of source operands with an eighth of said plurality of source operands to obtain a fourth sum and, if requested by said accumulatable packed multi-way addition instruction, accumulating a prior fourth sum with said sixth and eighth of said plurality of source operands, to obtain a fourth accumulated result.

5. The method of claim 4, further including, prior to adding any of the plurality of source operands:
   setting said first of said plurality of source operands equal to a first plurality of bits from said first of said plurality of operands, and setting said second source operand equal to a second plurality of bits from said first of said plurality of operands; and
   setting said third of said plurality of source operands equal to a first plurality of bits from said second of said plurality of operands, and setting said fourth source operand equal to a second plurality of bits from said second of said plurality of operands;
   setting said fifth of said plurality of source operands equal to a first plurality of bits from said third of said plurality of operands, and setting said sixth source operand equal to a second plurality of bits from said third of said plurality of operands; and
   setting said seventh of said plurality of source operands equal to a first plurality of bits from said fourth of said plurality of operands, and setting said eighth source operand equal to a second plurality of bits from said fourth of said plurality of operands.

6. The method of claim 1, wherein said setting comprises:
   determining the polarity to be set for each source operand; and
   setting the polarity of each source operand based on the determined polarity.

7. The method of claim 6, further comprising:
   rotating the determined polarity of each source operand two bits to the right.

8. The method of claim 1 wherein said setting said polarity of each of said plurality of source operands occurs during a first cycle.

9. The method of claim 1, wherein said outputting includes one of:
   storing a first sum formed by adding a first of said plurality of source operands with a third of said plurality of source operands, and storing a second sum formed by adding a second of said plurality of source operands with a fourth of said plurality of source operands; and
   storing a first accumulated sum formed by adding a first of said plurality of source operands with a third of said plurality of source operands and a prior first accumulated sum, and storing a second sum formed by adding a second of said plurality of source operands with a fourth of said plurality of source operands and a prior second accumulated sum.

10. The method of claim 9, wherein said storing said first sum formed by adding said first of said plurality of source operands with said third of said plurality of source operands, and storing said second sum formed by adding said second of said plurality of source operands with said fourth of said plurality of source operands further includes:
    storing a third sum formed by adding a fifth of said plurality of source operands with a seventh of said plurality of source operands, and storing a fourth sum formed by adding a sixth of said plurality of source operands with an eighth of said plurality of source operands.

11. The method of claim 9, wherein said storing said first accumulated sum formed by adding said first of said plurality of source operands with said third of said plurality of source operands and said prior-cycle first accumulated sum, and storing said second sum formed by adding said second of said plurality of source operands with said fourth of said plurality of source operands and said prior-cycle second accumulated sum further includes:
    storing a third accumulated sum formed by adding a fifth of said plurality of source operands with a seventh of said plurality of source operands and a prior-cycle third accumulated sum, and storing a fourth accumulate sum formed by adding a sixth of said plurality of source operands with an eighth of said plurality of source operands and a prior-cycle fourth accumulated sum.

12. The method of claim 1, wherein the setting said polarity of each of said plurality of source operands occurs during a first cycle.

13. The method of claim 1, wherein each of said adding and, if requested by said accumulatable packed multi-way addition instruction, said accumulating said at least one result; said outputting; and said accumulating condition codes occur during a second cycle.

14. The method of claim 1, wherein each of said adding pairs of said plurality of source operands to obtain at least one result and, if requested by said accumulatable packed multi-way addition instruction, said accumulating said at least one result to obtain at least one accumulated result; and accumulating condition codes for one of said at least one result and said at least one accumulated result, if requested by said accumulatable packed multi-way addition instruction, partially occur during a first cycle.

15. The method of claim 1, wherein each of said adding pairs of said plurality of source operands to obtain at least one result and, if requested by said accumulatable packed multi-way addition instruction, said accumulating said at least one result to obtain at least one accumulated result; and said accumulating condition codes for one of said at least one result and said at least one accumulated result, if requested by said accumulatable packed multi-way addition instruction partially occur during a second cycle.

16. The method of claim 1, wherein said outputting occurs during a second cycle.

17. The method of claim 1, wherein said adding comprises:
    adding pairs of the plurality of source operands to obtain a first plurality of results.

18. The method of claim 17 wherein said adding pairs of the plurality of source operands to obtain a first plurality of results comprises:
    adding a first of said plurality of source operands with a third of said plurality of source operands to obtain a first of said first plurality of results; and
    adding a second of said plurality of source operands with a fourth of said plurality of source operands to obtain a second of said first plurality of results.

19. The method of claim 18, wherein said adding pairs of said plurality of source operands to obtain at least one result and, if requested by said accumulatable packed multi-way addition instruction, said accumulating said at least one result to obtain at least one accumulated result further comprises one of:
    adding a prior first of said first plurality of results with a prior second of said first plurality of results to obtain at least one result; and
    adding the prior first of said first plurality of results with a prior second of said first plurality of results and with a prior third of said plurality of source operands to obtain at least one accumulated result, if requested by said accumulatable packed multi-way addition instruction.

20. A device comprising:
    a decoder to decode instructions; and
    a circuit coupled to said decoder, said circuit in response to a decoded instruction to
       set a polarity of each of a plurality of source operands derived from at least two operands, if said decoded instruction configures the circuit to do so;
       add pairs of said plurality of source operands to obtain at least one result and, if said decoded instruction configures the circuit to do so, accumulate said at least one result to obtain at least one accumulated result;
       output at least one of said at least one result and said at least one accumulated result; and
       accumulate condition codes for one of said at least one result and said at least one accumulated result, if said decoded instruction configures the circuit to do so.

21. The device as defined in claim 20, said circuit further comprising at least one of:
    a polarity setting register, said polarity setting register to conditionally set the polarity of each of said plurality of source operands;
    a plurality of compare result registers, said plurality of compare result registers to receive all compare results generated; and a plurality of 3:1 adders to perform addition and accumulation.

22. The device as defined in claim 21, wherein the operation of said plurality of 3:1 adders is dynamically controllable at runtime.

23. The device as defined in claim 21, wherein data generated during the execution of said decoded instruction determines the operation of subsequent instructions.

24. The device as defined in claim 21, wherein said device is one of a super-scalar processor and a Very Long Instruction Word (VLIW) processor.

25. A system, comprising:

a processor; and a machine-readable medium coupled to the processor in which is stored one or more instructions adapted to be executed by the processor, the instructions, when executed, configure the processor to decode an instruction as an accumulatable packed multi-way addition instruction, said accumulatable packed multi-way addition instruction being associated with at least one destination and a plurality of operands;

set a polarity of each of a plurality of source operands derived from said at least two operands, if requested by said accumulatable packed multi-way addition instruction;

add pairs of said plurality of source operands to obtain at least one result and, if requested by said accumulatable packed multi-way addition instruction, accumulate said at least one result to obtain at least one accumulated result;

output at least one pair of said at least one result and said at least one accumulated result; and accumulate condition codes for each of said at least one result and said at least one accumulated result, if requested by said accumulatable packed multi-way addition instruction.

26. The system of claim 25, wherein said processor comprises:

a decoder to decode instructions; and a circuit coupled to said decoder, said circuit being configured to execute one or more decoded accumulatable packed multi-way addition instructions.

27. The system of claim 26, wherein said circuit further comprises at least one of:

a polarity setting register, said polarity setting register to conditionally set the polarity of each of said plurality of source operands;

a plurality of compare result registers, said plurality of compare result registers to receive all compare results generated; and a plurality of 3:1 adders to perform addition and accumulation.

28. The system of claim 26, wherein said processor is one of a super-scalar processor and a Very Long Instruction Word (VLIW) processor.

29. A machine-readable medium in which is stored one or more instructions adapted to be executed by a processor, the instructions, when executed, configure the processor to:

decode an instruction as an accumulatable packed multi-way addition instruction, said accumulatable packed multi-way addition instruction being associated with at least one destination and a plurality of operands;

set a polarity of each of a plurality of source operands derived from said at least two operands, if said accumulatable packed multi-way addition instruction configures the processor to do so;

add pairs of said plurality of source operands to obtain at least one result and, if said accumulatable packed multi-way addition instruction, accumulate said at least one result to obtain at least one accumulated result;

output at least one pair of said at least one result and said at least one accumulated result; and accumulate condition codes for each of said at least one result and said at least one accumulated result, if said accumulatable packed multi-way addition instruction configures the processor to do so.

30. The machine-readable medium of claim 29, wherein the instructions which, when executed, further configure the processor to:

set a polarity of each of a plurality of source operands during a first cycle.

* * * * *

UNITED STATES PATENT AND TRADEMARK OFFICE
CERTIFICATE OF CORRECTION

PATENT NO. : 6,976,049 B2  Page 1 of 1
DATED : December 13, 2005
INVENTOR(S) : Gad Sheaffer It is certified that error appears in the above-identified patent and that said Letters Patent is hereby corrected as shown below:

Column 11,
Line 50, change "A method for comprising:" to -- A method comprising: --; and Column 14,
Line 1, change "accumulating condition codes" to -- said accumulating condition codes --.

Signed and Sealed this

Twenty-first Day of March, 2006

JON W. DUDAS
*Director of the United States Patent and Trademark Office*